(12) United States Patent
Berkobin et al.

(10) Patent No.: US 8,117,049 B2
(45) Date of Patent: Feb. 14, 2012

(54) METHODS, SYSTEMS, AND APPARATUSES FOR DETERMINING DRIVER BEHAVIOR

(75) Inventors: Eric C. Berkobin, Woodstock, GA (US); Diego Borrego, San Diego, CA (US); Fred Blumer, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 716 days.

(21) Appl. No.: 12/100,458

(22) Filed: Apr. 10, 2008

(65) Prior Publication Data

US 2008/0255888 A1    Oct. 16, 2008

Related U.S. Application Data

(60) Provisional application No. 60/910,870, filed on Apr. 10, 2007.

(51) Int. Cl.
*G05B 19/18* (2006.01)
*G06F 19/00* (2006.01)

(52) U.S. Cl. ............... 705/4; 340/500; 701/29
(58) Field of Classification Search .......... None
See application file for complete search history.

(56) References Cited

U.S. PATENT DOCUMENTS

| | | | | |
|---|---|---|---|---|
| 5,499,182 A | * | 3/1996 | Ousborne | 701/35 |
| 5,844,473 A | * | 12/1998 | Kaman | 340/439 |
| 5,974,368 A | * | 10/1999 | Schepps et al. | 340/5.61 |
| 6,076,026 A | * | 6/2000 | Jambhekar et al. | 701/35 |
| 6,542,077 B2 | * | 4/2003 | Joao | 340/426.16 |
| 2002/0013717 A1 | * | 1/2002 | Ando et al. | 705/4 |
| 2004/0153362 A1 | * | 8/2004 | Bauer et al. | 705/10 |
| 2006/0155439 A1 | * | 7/2006 | Slawinski et al. | 701/35 |

OTHER PUBLICATIONS

Zeimpekis et al., Urban dynamic real-time distribution services; Insights from SMEs, Journal of Enterprise Informaiton Management, Bradford: 2006, vol. 19, Iss. 4; p. 367.*

* cited by examiner

*Primary Examiner* — Rajesh Khattar
*Assistant Examiner* — Carol See
(74) *Attorney, Agent, or Firm* — John L. Doughty

(57) ABSTRACT

Provided are methods, systems, and apparatuses for determining driver behavior based on vehicle operating parameters, adjusting insurance premiums accordingly, and preventing fraudulent manipulation of the methods, systems, and apparatuses.

11 Claims, 10 Drawing Sheets

FIG. 4

| Your Summary | Your Trips | Your Diagnostics | Your Averages | Car Locator | TripSense Preferences | Driving Trips |

Your Diagnostics

| | |
|---|---|
| Oil Change Needed In | 423 miles |
| Tune Up Needed In | 3,147 miles |
| Tire Wear | Normal |
| Average MPG – weekly | 16.2 mpg |
| Check Engine Diagnosis | Normal |
| Vehicle Battery | Normal |
| Current Temperature | Normal |
| Recalls | Alert! |
| Emissions Status | Normal |

Your Preferred Service Provider
Deacon's Chrysler
835 Sam Center Rd
Mayfiled Village, OH 44343
(440) 442-0424
<u>edit</u>

Notifications
Weekly ☒    ☒ SMS    ☒ Email    ☒ Telephone

Vehicle Notices and Performance
☒ MPG
☒ Oil Change
☐ Tune Up
☐ Tire Wear
☐ Check Engine Diagnosis
☐ Emissions
☐ Recalls
☒ Battery
☒ Fuel System
☒ Coolant Level of Technical Diagnosis
☒ Low
☐ Medium
☐ High Vehicle Interaction Services
☐ Roadside Assistance
☐ Vehicle Location
☐ Teen Tracking
☐ Alert E-mails
☐ Service E-mails

METHODS, SYSTEMS, AND APPARATUSES FOR DETERMINING DRIVER BEHAVIOR

CROSS REFERENCE TO RELATED APPLICATION

This application claims priority to U.S. Provisional Application No. 60/910,870 filed Apr. 10, 2007, herein incorporated by reference in its entirety.

SUMMARY

In one aspect, provided are methods for determining driver behavior, comprising receiving vehicle performance data, determining a driver safety metric based on the vehicle performance data, and transmitting the safety metric to a remote host.

In another aspect, provided are methods for insurance premium adjustment, comprising receiving vehicle performance data, analyzing the vehicle performance data to determine one or more behaviors, and adjusting an insurance premium based on the one or more behaviors.

In yet another aspect, provided are methods for fraud detection, comprising retrieving a vehicle identification parameter through a vehicle bus, comparing the retrieved vehicle identification parameter with a stored vehicle identification profile, and performing a fraud action based on the comparison.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is an exemplary user interface;

DETAILED DESCRIPTION

Figure 1:
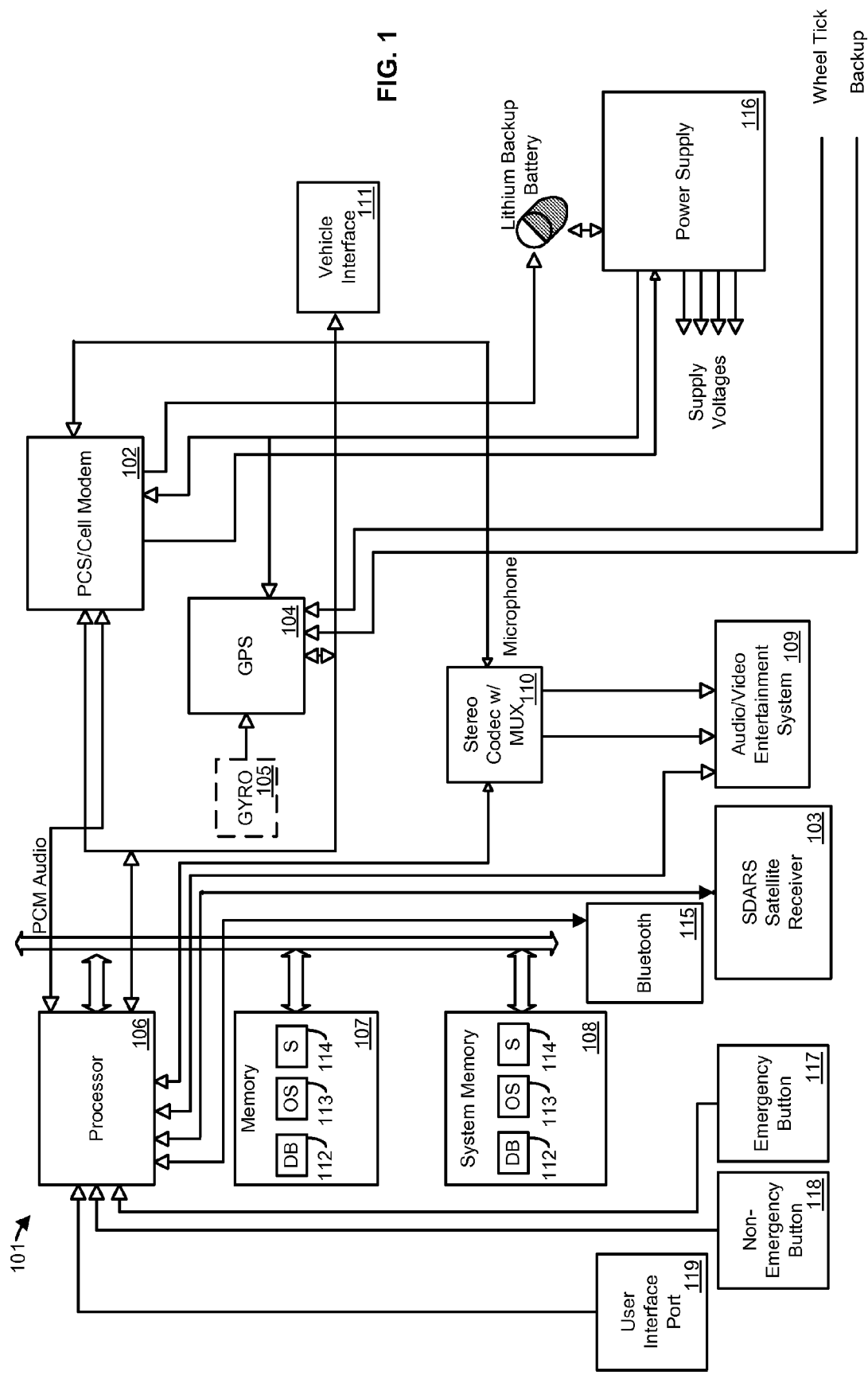
FIG. 1 is a schematic of an exemplary apparatus.

Before the present methods, systems, and apparatuses are disclosed and described, it is to be understood that the methods, systems, and apparatuses are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods, systems, and apparatuses may be understood more readily by reference to the following detailed description of preferred embodiments and the Examples included therein and to the Figures and their previous and following description.

Provided are methods, systems, and apparatuses that can utilize GPS capabilities and two-way in-vehicle data communications between an in car device and a telematics operations center. The methods, systems, and apparatuses enable a company, such as an insurance company, to gather data and develop relevant analytics. The methods, systems, and apparatuses can allow a company to provide offerings such as vehicle diagnostics and vehicle/driver tracking. These offerings can be at the discretion of a customer.

The methods, systems, and apparatuses can comprise an embedded GPS and cellular transceiver to support real-time, remote driver and vehicle performance metrics. GPS data can enhance the value and functionality of accurate location-based information. A dedicated data channel in the hardware can provide vehicle and driver information at a much more reliable and faster rate.

Benefits of the provided methods, systems, and apparatuses include, but are not limited to, a self-service interface allowing proactive vehicle management and personalization, real-time vehicle data access on driver behavior and diagnostics, enhanced customer relationship management, hence increasing customer loyalty.

In one aspect, provided is an apparatus comprising a telematics unit. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The apparatus 101 is also referred to herein as the VTU 101. The apparatus can perform any of the methods disclosed herein in part and/or in their entireties.

All components of the telematics unit can be contained within a single box and controlled with a single core processing subsystem or can be comprised of components distributed throughout a vehicle. Each of the components of the apparatus can be separate subsystems of the vehicle, for example, a communications component such as a SDARS, or other satellite receiver, can be coupled with an entertainment system of the vehicle.

An exemplary apparatus 101 is illustrated in FIG. 1. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 101 can comprise one or more communications components. Apparatus 101 illustrates communications components (modules) PCS/Cell Modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communications can include, but is not limited to GPRS, EDGE, UMTS, 1xRTT or EV-DO. The PCS/Cell Modem 102 can be a Wi-Fi or mobile WIMAX implementation that can support operation on both licensed and unlicensed wireless frequencies. The apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within the apparatus 101. Updating can be requested by the apparatus 101, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternately, the GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets and tunnels.

In an aspect, the GPS receiver 104 can activate on ignition or start of motion. The GPS receiver 104 can go into idle on ignition off or after ten minutes without motion. Time to first fix can be <45 s 90% of the time. For example, this can be achieved either through chipset selection or periodic wake-up.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data. The data can be routed through the Internet where it can be accessed, displayed and manipulated.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like. The database 112 can be centralized or distributed across multiple systems.

In some aspects, data can be stored and transmitted in loss-less compressed form and the data can be tamper-proof. Non-limiting examples of data that can be collected are as follows. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 101, and are executed by the processor 106 of the apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drivetrain computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained from, and processed data derived from, the various vehicle systems and sensors can be transmitted to a central monitoring station via the PCS/Cell Modem 102.

Communication with a vehicle driver can be through an infotainment (radio) head (not shown) or other display device (not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players (such as an ipod), and the like. Audio/video entertainment subsystem 109 can be controlled remotely through, for example, a wireless remote control, voice commands, and the like.

The methods, systems, and apparatuses provided can utilize a power management scheme ensuring that a consumer's car battery is not impaired under normal operating conditions. This can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

The apparatus 101 can receive power from power supply 114. The power supply can have many unique features necessary for correct operation within the automotive environment. One mode is to supple a small amount of power (typically less than 100 microamps) to at least one master controller that can control all the other power buses inside of the VTU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 114 to activate other functions within the VTU 101, such as GPS 104/GYRO 105, Processor 106/Memory 107 and 108, SDARS receiver 103, audio/video entertainment system 109, audio codec mux 110, and any other peripheral within the VTU 101 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the VTU.

Normal operation can comprise, for example, the PCS/Cellular modem 102 waiting for an emergency pushbutton key-press or CAN activity. Once either is detected, the PCS/Cellular modem 102 can awaken and enable the power supply 114 as required. Shutdown can be similar wherein a first level shutdown turns off everything except the PCS/Cellular modem 102, for example. The PCS/Cellular modem 102 can maintain wireless network contact during this state of operation. The VTU 101 can operate normally in the state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth transceiver 115 that can be provided to interface with devices such as phones, headsets, music players, and telematics user interfaces. The apparatus can comprise one or more user inputs, such as emergency button 117 and non-emergency button 118. Emergency button 117 can be coupled to the processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to the processor 106. One or more non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center. The voice connection permits two way voice communications between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the VTU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
FIG. 2 is an external view of an embodiment of an exemplary apparatus.

FIG. 2 illustrates an exemplary apparatus for connection to an OBD II port. FIG. 2 illustrates an exemplary apparatus comprising one external wire for connection to the OBD II port, and a built-in antenna. In one aspect, the apparatuses can be as small as possible according to customer preferences and engineering capabilities. The apparatuses can have display functions such as LEDs, and the like. The apparatuses can be small and unobtrusive to a vehicle operator. The apparatuses can be easily installed and removed by end customers with average technical ability. The apparatuses can tolerate shock from most automobile accidents and reasonable impacts.

Figure 3:
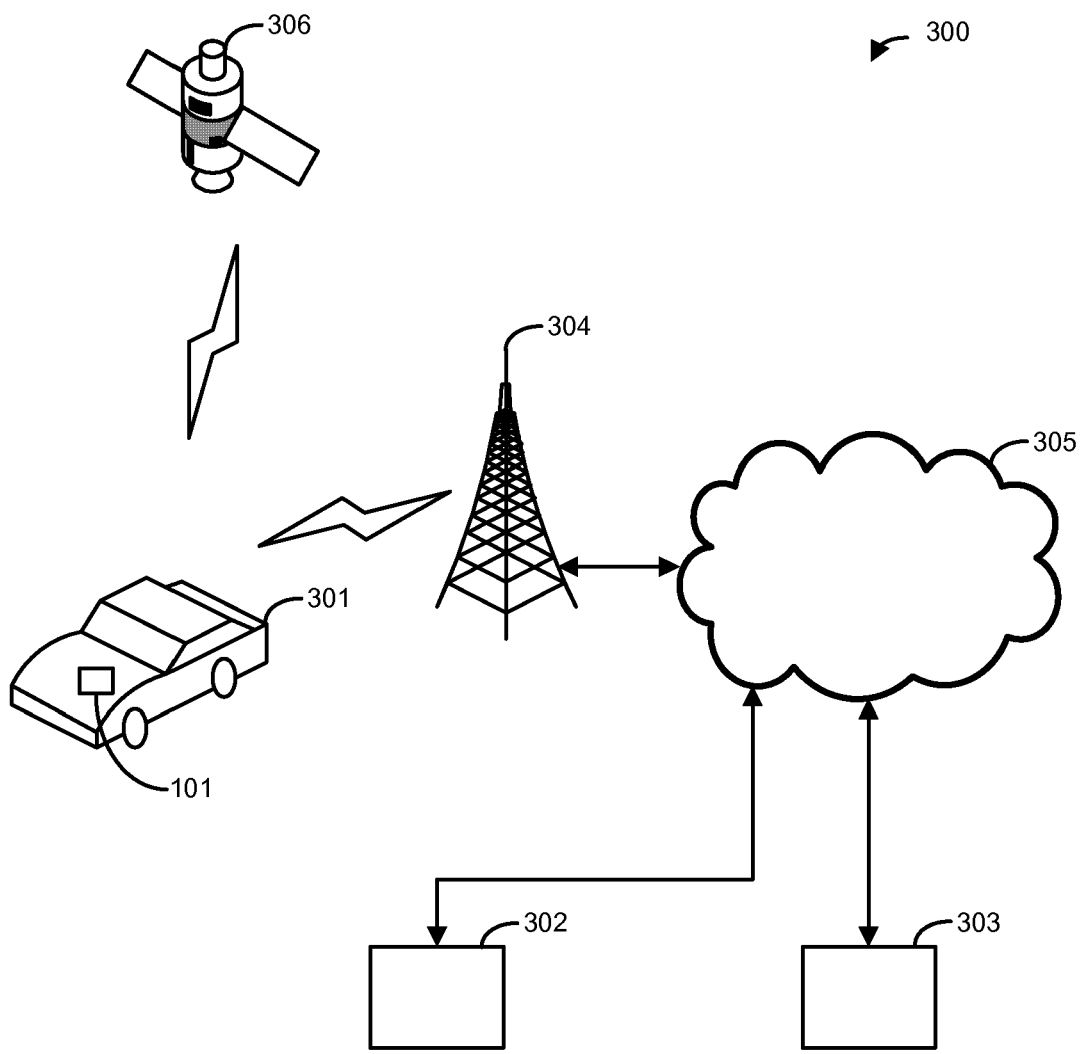
FIG. 3 is an exemplary system.

FIG. 3 is a block diagram illustrating an exemplary driver behavior determination system 300 showing network connectivity between various components. The driver behavior determination system 300 can comprise a VTU 101 located in a motor vehicle 301. The driver behavior determination system 300 can comprise a central monitoring station 302. The central monitoring station 302 can serve as a market specific data gatekeeper. That is, users 303 can pull information from specific, multiple or all markets at any given time for immediate analysis. The distributed computing model has no single point of complete system failure, thus minimizing driver behavior determination system 300 downtime. In an embodiment, central monitoring station 302 can communicate through an existing communications network (e.g., wireless towers 304 and communications network 305). Driver behavior determination system 300 can comprise at least one satellite 306 from which GPS data are determined. These signals can be received by a GPS receiver in the vehicle 301.

The driver behavior determination system 300 can comprise a plurality of users 303 (insurance companies, governments, individuals, and the like) which can access driver behavior determination system 300 using a computer or other such computing device, running a commercially available Web browser or client software. For simplicity, FIG. 3 shows only one user 303. The users 303 can connect to the driver behavior determination system 300 via the communications network 305. In an embodiment, communications network 305 can comprise the Internet.

The driver behavior determination system 300 can comprise a central monitoring station 302 which can comprise one or more central monitoring station servers. In some aspects, one or more central monitoring station servers can serve as the "back-bone" (i.e., system processing) of the present driver behavior determination system 300. One skilled in the art will appreciate that driver behavior determination system 300 can utilize servers (and databases) physically located on one or more computers and at one or more locations. Central monitoring station server can comprise software code logic that is responsible for handling tasks such as data interpretations, statistics processing, data preparation and compression for output to VTU 101, and application of underwriting guidelines, behavior determination, and driving report generation for output to users 303. In an embodiment, user 303 can host a server (also referred to as a remote host) that can perform similar functions as a central monitoring station server. In an embodiment of the present driver behavior determination system 300, central monitoring station servers and/or remote host servers, can have access to a repository database which can be a central store for all information and vehicle performance data within the driver behavior determination system 300 (e.g., executable code, subscriber information such as login names, passwords, etc., and vehicle and demographics related data). Central monitoring station servers and/or a remote host server can also provide a "front-end" for the driver behavior determination system 300. That is, a central monitoring station server can comprise a Web server for providing a Web site which sends out Web pages in response to requests from remote browsers (i.e., users 303 or customers of users 303). More specifically, a central monitoring station server and/or a remote host server can provide a graphical user interface (GUI) "front-end" to users 303 of the driver behavior determination system 300 in the form of Web pages. These Web pages, when sent to the user PC (or the like), can result in GUI screens being displayed.

Provided is a dynamic means for presenting location and diagnostics data to consumers in a useful and attractive format. Users/consumers can actively monitor their vehicle's location, speed history, stop history, vehicle health, driving report, etc. . . . through a web-interface. Any or all of the data generated by the features described above including but not limited to, diagnostics and monitored driver behavior can be uploaded to the internet, stored for display on a web-site, and/or sent to the vehicle owner (or other approved party) via and e-mail or text message (SMS). An exemplary interface is illustrated in FIG. 4.

In one aspect, an exemplary flow and operation of the driver behavior determination system 300 can be as follows: After a pre-determined time interval (e.g., a time interval measured in days, hours, minutes, etc.) of monitoring and recording vehicle performance data, the VTU 101 can prepare stored vehicle performance data for transmission as one or more packets. A packet can be sent via a wireless link to central monitoring station 302 through communications network 305. There, the vehicle performance data can be processed (i.e., compiled and analyzed) by a server. In another embodiment, the vehicle performance data can be processed (i.e., compiled and analyzed) by the VTU 101 and processed data can be transmitted to central monitoring station 302. The processed performance data can then be made ready for distribution (i.e., reports generated by server) to users 303. The VTU 301 may be configured to transmit vehicle performance data collected from the vehicle with varying frequency (e.g., once every 5 minutes, twice a day, etc.). Such frequency can depend on factors such as the size of the memory of the VTU 101, bandwidth of the communications network 305, needs of the users 303, and the like.

In an aspect, the VTU 101 can transmit vehicle performance data upon a triggering event such as, but not limited to vehicle crash indication, acceleration above a threshold, speed above a threshold, and the like. VTU 101 transmission of vehicle performance data packets can be on any of a fixed time basis, fixed amount of data basis, or fixed event basis and can be downloadable from a central monitoring station server and/or website.

As described above, VTU 101 can communicate with one or more computers, either through direct wireless communication and/or through a network such as the Internet. Such communication can facilitate data transfer, voice communication, and the like. One skilled in the art will appreciate that what follows is a functional description of an exemplary computing device and that various functions can be performed by software, by hardware, or by any combination of software and hardware.

Figure 5:
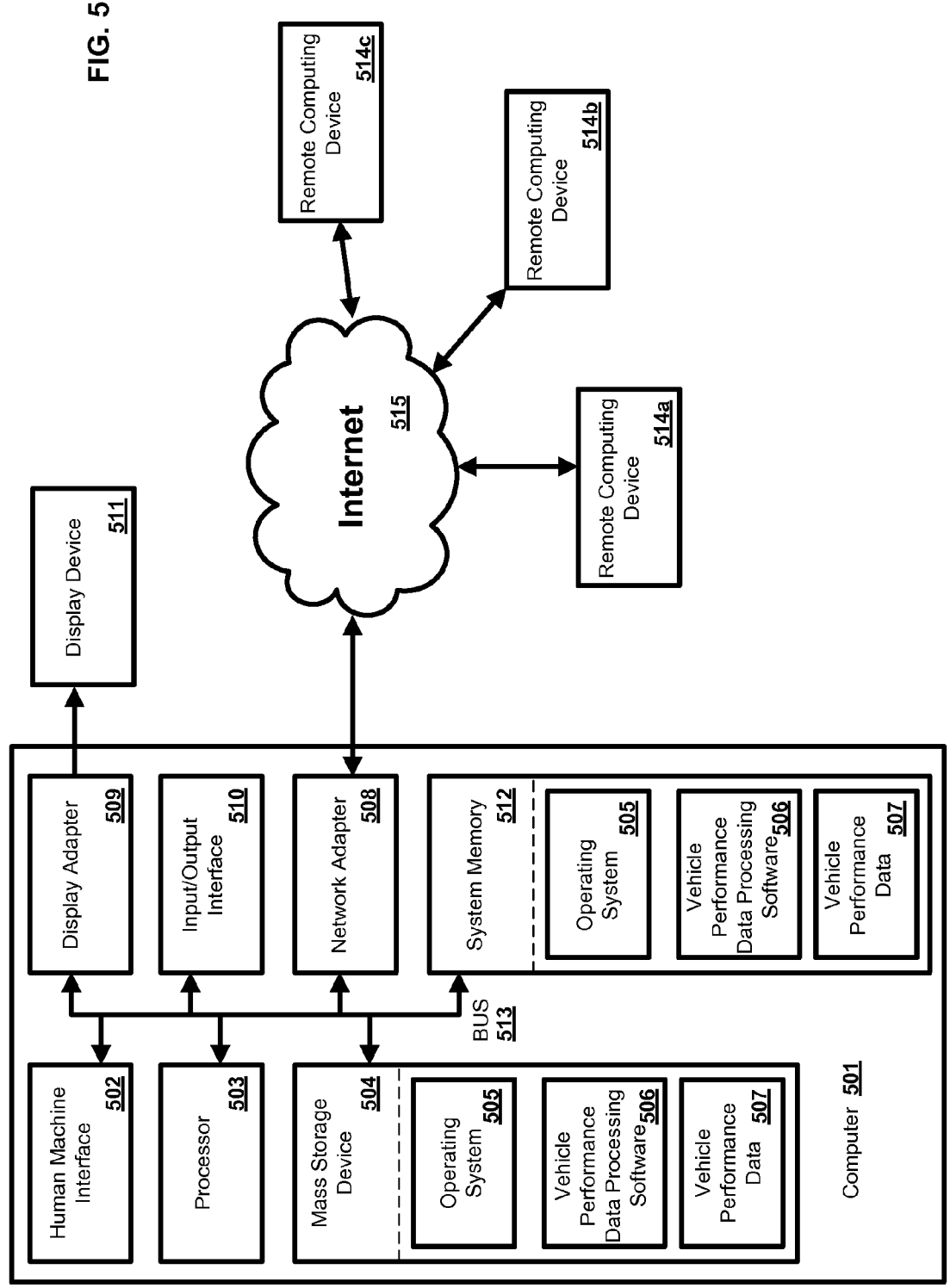
FIG. 5 is an exemplary operating environment for disclosed methods.

FIG. 5 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 513, and all buses specified in this description can also be implemented over a wired or wireless network connection and each of the subsystems, including the processor 503, a mass storage device 504, an operating system 505, telematics software 506, vehicle performance data 507, a network adapter (or communications interface) 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system. In one aspect, a remote computing device can be a VTU 101.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as vehicle performance data 507 and/or program modules such as operating system 505 and vehicle performance data processing software 506 that are immediately accessible to and/or are presently operated on by the processing unit 503. Vehicle performance data 507 can comprise any data generated by, generated for, received from, or sent to the VTU 101.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and vehicle performance data processing software 506. Each of the operating system 505 and vehicle performance data processing software 506 (or some combination thereof) can comprise elements of the programming and the vehicle performance data processing software 506. Vehicle performance data 507 can also be stored on the mass storage device 504. Vehicle performance data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices 514*a,b,c*. By way of example, a remote computing device can be a personal computer, portable computer, a server, a router, a network computer, a VTU 101, a PDA, a cellular phone, a "smart" phone, a wireless communications enabled key fob, a peer device or other common network node, and so on. Logical connections between the computer 501 and a remote computing device 514*a,b,c* can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514*a,b,c* can be one or more VTU 101's.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of vehicle performance data processing software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Predicting driver behavior is important to the insurance industry as well as any business that operates a fleet of vehicles and is concerned about driver behavior liability.

Detection of an actual crash event absent a connection to the internal busses of a vehicle can be challenging. Even with the use of accelerometers—which have their own unique set of challenges ranging from installation issues to false positives—crash determination without the presence of a two-way voice connection for confirmation is problematic.

Provided are methods, systems, and apparatuses for determining a "probability" of a crash, which leverages vehicle data to predict driver behavior. Any available method for accessing a vehicle data bus can be used. For example, a vehicle's OBD data stream can be used to extrapolate key data points indicating that a crash may have occurred. For example, these methods can rely on a rapid drop in OBD II speed from a predetermined threshold to zero in a short period of time.

Frequent readings (in some aspects, as often as 1 second) of OBD II speed can determine many aspects of driver behavior in addition to a crash, for example, rapid acceleration & rapid deceleration, slow acceleration & slow deceleration, unpredictable acceleration & deceleration patterns, successive acceleration & deceleration cycles, and determining a driver identity by mapping speed patterns into a signature.

Just as frequent readings (in some aspects, as often as 1 second) of OBD II speed can be a cost-effective way to monitor and measure driver behavior, frequent readings of GPS location and/or speed can augment this scenario.

Frequent GPS readings (in some aspects, as often as 1 second) can also be used to create a moving scatter diagram within the 3 meter resolution of a standard GPS system (approximately the width of a standard roadway driving lane) to determine lane changing behavior slow lane change (riding the dividing line), rapid lane change (abrupt lateral movement), frequent lane change, traveling too slowly for the appropriate lane, moving faster than speed limit (if speed limit of roadway is known), traveling below minimum legal speed for a roadway, and determining a driver identity by mapping GPS patterns into a signature.

Figure 6:
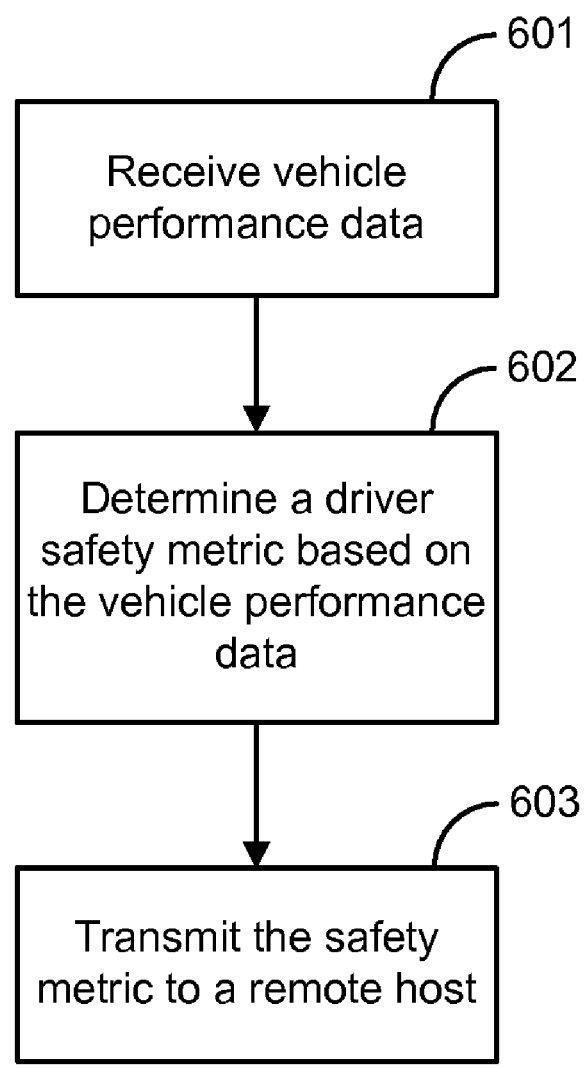
FIG. 6 is a flow diagram illustrating an exemplary method for determining driving behavior.

In an aspect, illustrated in FIG. 6, provided are methods for determining driver behavior, comprising receiving vehicle performance data at 601, determining a driver safety metric based on the vehicle performance data at 602, and transmitting the safety metric to a remote host at 603. A safety metric can be any indication of driving behavior safety. For example, a safety metric can be a categorization of driving behavior, a safety metric can be an insurance premium, a safety metric can be processed vehicle performance data, and the like.

The methods can be performed on an in-vehicle apparatus, at a central monitoring station, at a remote host, and combinations thereof. The methods can further comprise outputting a visual representation of the safety metric to a display device.

Vehicle performance data can comprise one or more of, acceleration, acceleration time, acceleration frequency, location of acceleration, deceleration, deceleration time, deceleration frequency, location of deceleration, speed, location of speed, lane change, speed of lane change, frequency of lane change, location of lane change, weather, weather during acceleration, weather during deceleration, weather during speed, weather during lane change, time of day, acceleration time of day, deceleration time of day, speed time of day, lane change time of day, telephone usage, timing of telephone usage, vehicle entertainment system usage, timing of vehicle entertainment system usage, vehicle occupancy, and seatbelt usage. These vehicle performance data can be indicative of driver behavior. These data can be obtained though a vehicle diagnostic port and through a combination of the vehicle diagnostic report and GPS location data. The vehicle performance data indicate driving behavior when considered alone, or in combination with other vehicle performance data. For example, a driver traveling at 50 miles per hour could be considered safe, but a driver traveling 50 miles per hour without a safety belt engaged and while traveling on a road with a known speed limit of 25 miles per hour can be considered unsafe. One skilled in the art can appreciate the variety of combinations of vehicle performance data and the driving behavior indicated. Any and all combinations of such vehicle performance data are specifically contemplated. The vehicle performance data can comprise personal identification data. The personal identification data can comprise a Vehicle Identification Number (VIN).

Receiving vehicle performance data can comprise receiving vehicle performance data at an in-vehicle apparatus and transmitting the vehicle performance data to a central monitoring station.

Determining a driver safety metric based on the vehicle performance data can comprise analyzing the vehicle performance data to determine one or more behaviors. For example, a driver interacting with the vehicle entertainment system while traveling over the speed limit and performing abrupt lane changes can be considered an unsafe driver.

Analyzing the vehicle performance data to determine one or more behaviors can comprise applying third party underwriting guidelines. Insurance companies are permitted to implement rates by grouping their insured into categories, each category paying different rates depending upon the nature of the category. Insurance companies develop and maintain underwriting guidelines or rules which define the nature of the rating categories and describe the differences between the categories. In one aspect, the methods, systems, and apparatuses provided can utilize an insurance company's existing underwriting guidelines, or newly created guidelines that take advantage of the detailed driving behavior information provided. In another aspect, the methods, systems, and apparatuses provided can categorize driving behavior without regard to a third party underwriting guideline. Analyzing the vehicle performance data to determine one or more behaviors can comprise categorizing vehicle performance into a plurality of risk strata. The plurality of risk strata can comprise safe, unsafe, and aggressive. For example, the methods, systems, and apparatuses can analyze vehicle performance data, categorize driver behavior, and provide this categorization to a third party, such as an insurance company, a vehicle owner, a vehicle driver, and the like.

The methods can further comprise generating a driving report based on the vehicle performance data and providing the driving report to a user through a website. Either the central monitoring station, the remote host, or both, can provide such a website.

In order for the methods, systems, and apparatuses to function properly, it is advantageous to ascertain whether the apparatus is properly installed, functioning, and that it is not being periodically removed from a monitored vehicle or moved from vehicle to vehicle. Provided are methods for detecting events of device removal and attempted fraud based on vehicle emissions status and monitor status.

A serial number for the apparatus can be stored in apparatus memory along with a vehicle identification number (VIN) intended to be associated with the serial number. Periodically, the apparatus can retrieve, through a vehicle bus, a VIN of the vehicle in which the apparatus is installed. The apparatus can compare the stored VIN to the retrieved VIN. If there is a discrepancy, the apparatus can perform one or more fraud actions. Fraud actions can include, but are not limited to, reporting the results of the comparison to a central monitoring station, terminating monitoring activity, and the like.

Figure 7:
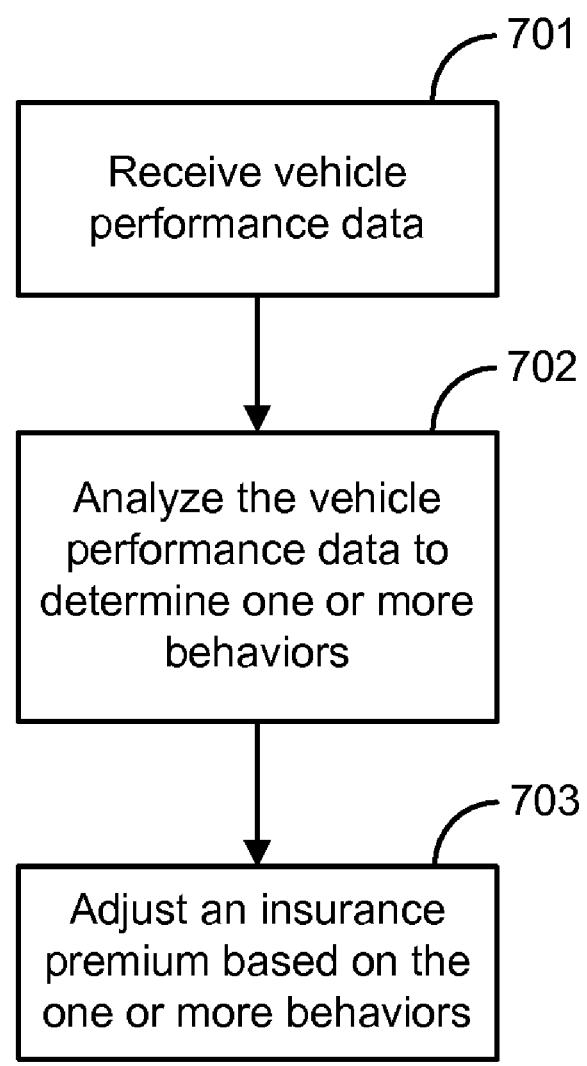
FIG. 7 is a flow diagram illustrating an exemplary method for insurance premium adjustment.

In another aspect, illustrated in FIG. 7, provided are methods for insurance premium adjustment, comprising receiving vehicle performance data at 701, analyzing the vehicle performance data to determine one or more behaviors at 702, and adjusting an insurance premium based on the one or more behaviors at 703. The methods can further comprise outputting a visual representation of the insurance premium to a display device. The methods can further comprise generating a driving report based on the vehicle performance data and providing the driving report to a user through a website.

Vehicle performance data can comprise one or more of, acceleration, acceleration time, acceleration frequency, location of acceleration, deceleration, deceleration time, deceleration frequency, location of deceleration, speed, location of speed, lane change, speed of lane change, frequency of lane change, location of lane change, weather, weather during acceleration, weather during deceleration, weather during speed, weather during lane change, time of day, acceleration time of day, deceleration time of day, speed time of day, lane change time of day, telephone usage, timing of telephone usage, vehicle entertainment system usage, timing of vehicle entertainment system usage, vehicle occupancy, and seatbelt usage. These vehicle performance data can be indicative of driver behavior. These data can be obtained though a vehicle diagnostic port and through a combination of the vehicle diagnostic report and GPS location data. The vehicle performance data indicate driving behavior when considered alone, or in combination with other vehicle performance data. For example, a driver traveling at 50 miles per hour could be considered safe, but a driver traveling 50 miles per hour without a safety belt engaged and while traveling on a road with a known speed limit of 25 miles per hour can be considered unsafe. One skilled in the art can appreciate the variety of combinations of vehicle performance data and the driving behavior indicated. Any and all combinations of such vehicle performance data are specifically contemplated. The vehicle performance data can comprise personal identification data. The personal identification data can comprise a Vehicle Identification Number (VIN). Transmitted vehicle performance data can be received and processed at a central monitoring station.

Determining a driver safety metric based on the vehicle performance data can comprise analyzing the vehicle performance data to determine one or more behaviors. For example, a driver interacting with the vehicle entertainment system while traveling over the speed limit and performing abrupt lane changes can be considered an unsafe driver.

Analyzing the vehicle performance data to determine one or more behaviors can comprise applying third party underwriting guidelines. Insurance companies are permitted to implement rates by grouping their insured into categories, each category paying different rates depending upon the nature of the category. Insurance companies develop and maintain underwriting guidelines or rules which define the nature of the rating categories and describe the differences between the categories. In one aspect, the methods, systems, and apparatuses provided can utilize an insurance company's existing underwriting guidelines, or newly created guidelines that take advantage of the detailed driving behavior information provided. In another aspect, the methods, systems, and apparatuses provided can categorize driving behavior without regard to a third party underwriting guideline. Analyzing the vehicle performance data to determine one or more behaviors can comprise categorizing vehicle performance into a plurality of risk strata. The plurality of risk strata can comprise safe, unsafe, and aggressive. For example, the methods, systems, and apparatuses can analyze vehicle performance data, categorize driver behavior, and provide this categorization to a third party, such as an insurance company, a vehicle owner, a vehicle driver, and the like.

Figure 8:
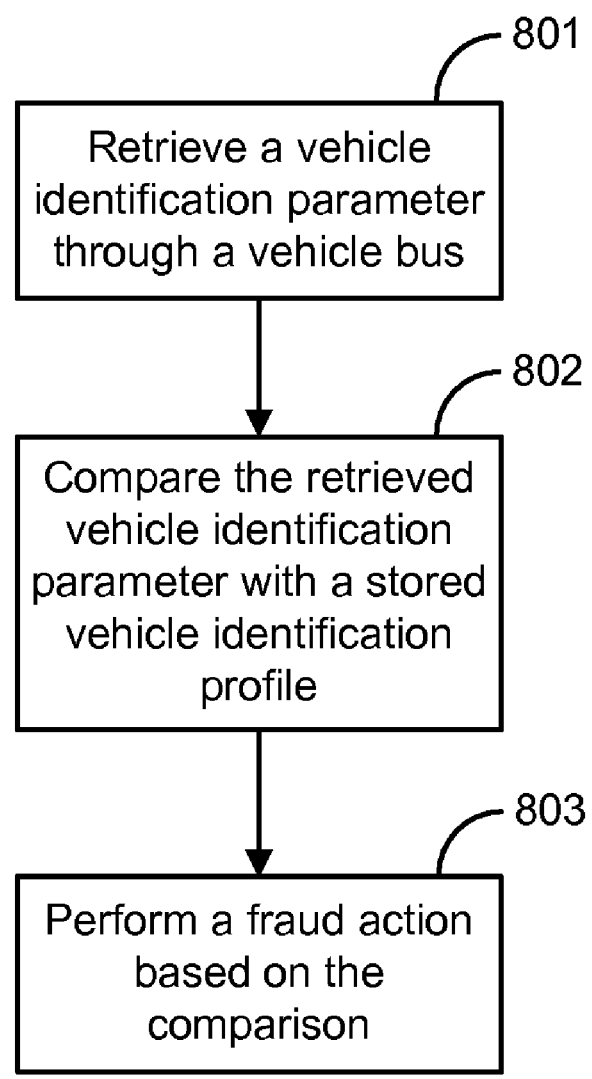
FIG. 8 is a flow diagram illustrating an exemplary method for fraud detection.

In an aspect, illustrated in FIG. 8, provided are methods for fraud detection, comprising retrieving a vehicle identification parameter through a vehicle bus at 801, comparing the retrieved vehicle identification parameter with a stored vehicle identification profile at 802, and performing a fraud action based on the comparison at 803. The vehicle identification parameter can be, for example, a vehicle identification number (VIN), one or more vehicle operating parameters, and combinations thereof. Vehicle operating parameters can vary between vehicles. For example, vehicle operating parameters of a sports car can be much different than that of an economy car. For example, idle speed, fuel economy, and the like. The methods, systems, and apparatuses can create a vehicle identification profile based on vehicle operating parameters monitored over time while installed in a vehicle and regularly compare current vehicle operating parameters to the profile. The vehicle identification profile can also comprise the VIN of the vehicle in which the apparatus is intended to be installed. If the apparatus is moved to another vehicle, it can be determined if the new vehicle operating parameters and/or VIN differ from the vehicle identification profile, thereby causing a fraud action to be performed. The fraud action can comprise reporting the results of the comparison to a central monitoring station, terminating monitoring activity, and the like.

Figure 9:
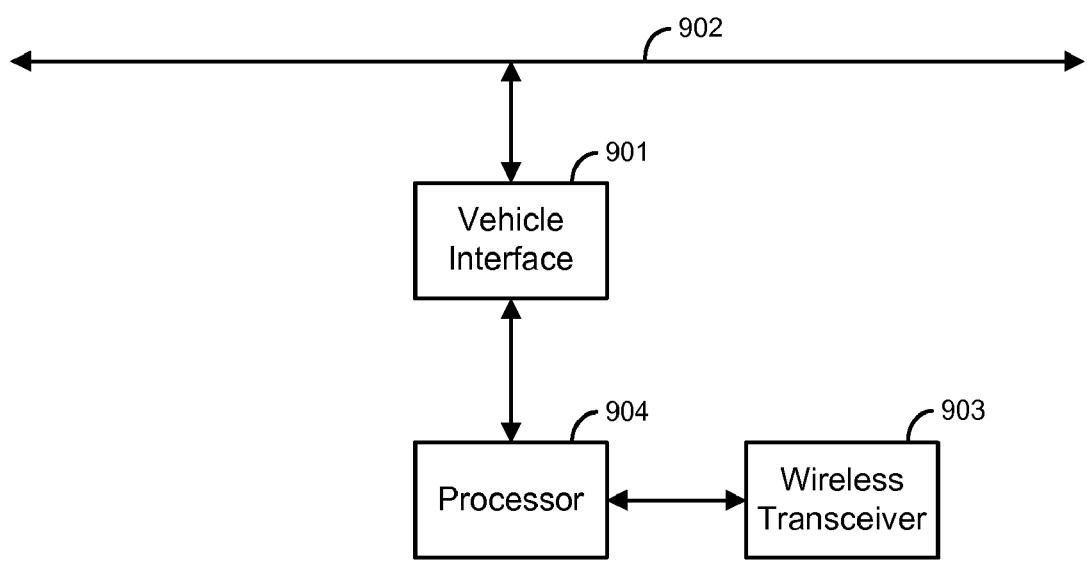
FIG. 9 is an exemplary apparatus.

In another aspect, illustrated in FIG. 9, provided is an apparatus for driver behavior determination, comprising a vehicle interface 901, coupled to a vehicle bus 902, wherein the vehicle interface 901 is configured to receive vehicle performance data through the vehicle bus 902, a wireless transceiver 903, configured for transmitting the vehicle performance data, and a processor 904, coupled to the vehicle interface 901 and the wireless transceiver 903, wherein the processor 904 is wherein the processor is configured for receiving the vehicle performance data from the vehicle interface 901, determining a driver safety metric based on the vehicle performance data, and for providing the driver safety metric to the wireless transceiver 903. The apparatus can further comprise a GPS transceiver coupled to the processor 904. The apparatus can further comprise an output device coupled to the processor 904, configured for displaying a visual representation of the safety metric. The wireless transceiver 903 can be configured for transmitting the vehicle performance data to a remote host. The wireless transceiver 903 can be is configured for transmitting the vehicle performance data to a central monitoring station. In another aspect, the apparatus can be further configured for performing the methods disclosed herein for performing fraud detection. In yet another aspect, the apparatus can be further configured for performing the methods disclosed herein for insurance premium adjustment.

Vehicle performance data can comprise one or more of, acceleration, acceleration time, acceleration frequency, location of acceleration, deceleration, deceleration time, deceleration frequency, location of deceleration, speed, location of speed, lane change, speed of lane change, frequency of lane change, location of lane change, weather, weather during acceleration, weather during deceleration, weather during speed, weather during lane change, time of day, acceleration time of day, deceleration time of day, speed time of day, lane change time of day, telephone usage, timing of telephone usage, vehicle entertainment system usage, timing of vehicle entertainment system usage, vehicle occupancy, and seatbelt usage. These vehicle performance data can be indicative of driver behavior. These data can be obtained though a vehicle diagnostic port and through a combination of the vehicle diagnostic report and GPS location data. The vehicle performance data indicate driving behavior when considered alone, or in combination with other vehicle performance data. For example, a driver traveling at 50 miles per hour could be considered safe, but a driver traveling 50 miles per hour without a safety belt engaged and while traveling on a road with a known speed limit of 25 miles per hour can be considered unsafe. One skilled in the art can appreciate the variety of combinations of vehicle performance data and the driving behavior indicated. Any and all combinations of such vehicle performance data are specifically contemplated. The vehicle performance data can comprise personal identification data. The personal identification data can comprise a Vehicle Identification Number (VIN). Transmitted vehicle performance data can be received and processed at a central monitoring station.

Determining a driver safety metric based on the vehicle performance data can comprise analyzing the vehicle performance data to determine one or more behaviors. For example, a driver interacting with the vehicle entertainment system while traveling over the speed limit and performing abrupt lane changes can be considered an unsafe driver.

Analyzing the vehicle performance data to determine one or more behaviors can comprise applying third party underwriting guidelines. Insurance companies are permitted to implement rates by grouping their insured into categories, each category paying different rates depending upon the nature of the category. Insurance companies develop and maintain underwriting guidelines or rules which define the nature of the rating categories and describe the differences between the categories. In one aspect, the methods, systems, and apparatuses provided can utilize an insurance company's existing underwriting guidelines, or newly created guidelines that take advantage of the detailed driving behavior information provided. In another aspect, the methods, systems, and apparatuses provided can categorize driving behavior without regard to a third party underwriting guideline. Analyzing the vehicle performance data to determine one or more behaviors can comprise categorizing vehicle performance into a plurality of risk strata. The plurality of risk strata can comprise safe, unsafe, and aggressive. For example, the methods, systems, and apparatuses can analyze vehicle performance data, categorize driver behavior, and provide this categorization to a third party, such as an insurance company, a vehicle owner, a vehicle driver, and the like.

The transmitted vehicle performance data can be processed to determine driver behavior, driver risk category, associated insurance premium adjustments, and combinations thereof. The apparatus can be configured to receive an indication of driving behavior based on the vehicle performance data. The indication of driving behavior can be displayed to the driver of the vehicle on one or more output devices. For example, a warning (or compliment) can be provided to the driver on a display screen in the vehicle cockpit, one or more LEDs on the instrument cluster can indicate driving behavior, and the like.

In some aspects, the wireless transceiver 903 can be configured to transmit the vehicle performance data based on a triggering event. The triggering event can comprise one or more of, vehicle crash indication, acceleration above a threshold, speed above a threshold, and the like. The wireless transceiver 903 can be configured to transmit the vehicle performance data based on one or more of, a fixed time basis, fixed amount of data basis, or fixed event basis.

Figure 10:
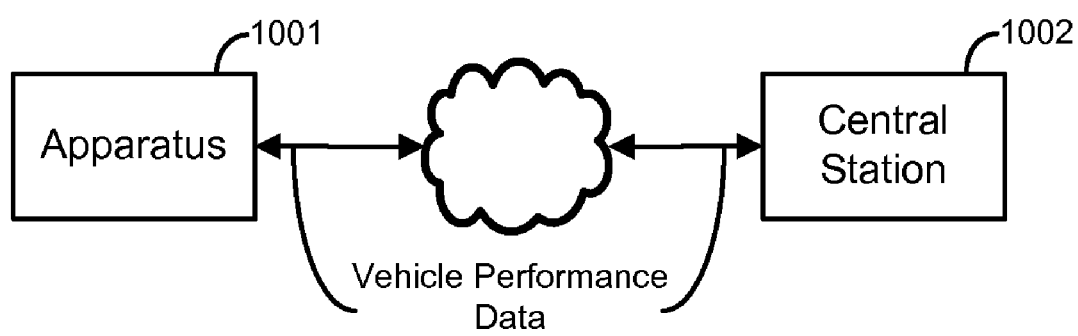
FIG. 10 is an exemplary system.

In another aspect, illustrated in FIG. 10, provided is a system for driver behavior determination, comprising a telematics device 1001, configured for receiving vehicle performance data through a vehicle bus and transmitting the vehicle performance data and a central monitoring station 1002, configured for receiving the vehicle performance data, determining a driver safety metric based on the vehicle performance data, and transmitting the safety metric to a remote host. The central monitoring station 1002 can be further configured for outputting a visual representation of the safety metric to a display device. In another aspect, the system can be further configured for performing the methods disclosed herein for performing fraud detection. In yet another aspect, the system can be further configured for performing the methods disclosed herein for insurance premium adjustment.

Vehicle performance data can comprise one or more of, acceleration, acceleration time, acceleration frequency, location of acceleration, deceleration, deceleration time, deceleration frequency, location of deceleration, speed, location of speed, lane change, speed of lane change, frequency of lane change, location of lane change, weather, weather during acceleration, weather during deceleration, weather during speed, weather during lane change, time of day, acceleration time of day, deceleration time of day, speed time of day, lane change time of day, telephone usage, timing of telephone usage, vehicle entertainment system usage, timing of vehicle entertainment system usage, vehicle occupancy, and seatbelt usage. These vehicle performance data can be indicative of driver behavior. These data can be obtained though a vehicle diagnostic port and through a combination of the vehicle diagnostic report and GPS location data. The vehicle performance data indicate driving behavior when considered alone, or in combination with other vehicle performance data. For example, a driver traveling at 50 miles per hour could be considered safe, but a driver traveling 50 miles per hour without a safety belt engaged and while traveling on a road with a known speed limit of 25 miles per hour can be considered unsafe. One skilled in the art can appreciate the variety of combinations of vehicle performance data and the driving behavior indicated. Any and all combinations of such vehicle performance data are specifically contemplated. The vehicle performance data can comprise personal identification data.

The personal identification data can comprise a Vehicle Identification Number (VIN). Transmitted vehicle performance data can be received and processed at a central monitoring station.

Determining a driver safety metric based on the vehicle performance data can comprise analyzing the vehicle performance data to determine one or more behaviors. For example, a driver interacting with the vehicle entertainment system while traveling over the speed limit and performing abrupt lane changes can be considered an unsafe driver.

Analyzing the vehicle performance data to determine one or more behaviors can comprise applying third party underwriting guidelines. Insurance companies are permitted to implement rates by grouping their insured into categories, each category paying different rates depending upon the nature of the category. Insurance companies develop and maintain underwriting guidelines or rules which define the nature of the rating categories and describe the differences between the categories. In one aspect, the methods, systems, and apparatuses provided can utilize an insurance company's existing underwriting guidelines, or newly created guidelines that take advantage of the detailed driving behavior information provided. In another aspect, the methods, systems, and apparatuses provided can categorize driving behavior without regard to a third party underwriting guideline. Analyzing the vehicle performance data to determine one or more behaviors can comprise categorizing vehicle performance into a plurality of risk strata. The plurality of risk strata can comprise safe, unsafe, and aggressive. For example, the methods, systems, and apparatuses can analyze vehicle performance data, categorize driver behavior, and provide this categorization to a third party, such as an insurance company, a vehicle owner, a vehicle driver, and the like.

The transmitted vehicle performance data can be processed to determine driver behavior, driver risk category, associated insurance premium adjustments, and combinations thereof. The apparatus can be configured to receive an indication of driving behavior based on the vehicle performance data. The indication of driving behavior can be displayed to the driver of the vehicle on one or more output devices. For example, a warning (or compliment) can be provided to the driver on a display screen in the vehicle cockpit, one or more LEDs on the instrument cluster can indicate driving behavior, and the like.

The central monitoring station can be configured to transmit an indication of driving behavior based on the vehicle performance data. The indication of driving behavior can be displayed to the driver of the vehicle on one or more output devices. For example, a warning (or compliment) can be provided to the driver on a display screen in the vehicle cockpit, one or more LEDs on the instrument cluster can indicate driving behavior, and the like.

The telematics device can be configured to transmit the vehicle driver behavior determination data based on a triggering event. The triggering event can comprise one or more of, vehicle crash indication, acceleration above a threshold, speed above a threshold, and the like. The telematics device can be configured to transmit the vehicle driver behavior determination data based on one or more of, a fixed time basis, fixed amount of data basis, or fixed event basis.

The central monitoring station 1002, the remote host, or both, can be configured to generate a driving report based on the vehicle performance data and providing the driving report to a user through a website.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for fraud detection, comprising:
retrieving, over a predetermined period, by a telematics device coupled to a vehicle's data bus, data corresponding to at least one vehicle parameter;
evaluating the data corresponding to the at least one vehicle parameter retrieved over the predetermined period;
generating, by the telematics device, a vehicle identification profile based on the evaluating of the data retrieved over the predetermined period;
storing the vehicle identification profile to a memory of the telematics device;
comparing current retrieved vehicle data with the stored vehicle identification profile;
determining, by the telematics device, whether the device has been fraudulently coupled to a vehicle bus by determining if the current retrieved vehicle data substantially matches the stored vehicle identification profile; and
performing a fraud action if the current retrieved vehicle data does not substantially match the stored vehicle identification profile.

2. The method of claim 1, wherein the vehicle parameter comprises one or more vehicle operating parameters, a vehicle identification number (VIN), and combinations thereof.

3. The method of claim 1, wherein performing a fraud action comprises reporting the results of the comparison to a central monitoring station.

4. The method of claim 3, wherein performing a fraud action comprises terminating monitoring at the central monitoring station.

5. A telematics device configured to perform the steps of a method for fraud detection, the method comprising:
retrieving, over a predetermined period, data corresponding to at least one vehicle parameter;
evaluating the data corresponding to the at least one vehicle parameter retrieved over the predetermined period;
generating a vehicle identification profile based on the evaluating of the data retrieved over the predetermined period;
storing the vehicle identification profile to a memory of the telematics device;

comparing current retrieved vehicle data with the stored vehicle identification profile;

determining whether the device has been fraudulently coupled to a vehicle bus by determining if the current retrieved vehicle data substantially matches the stored vehicle identification profile; and performing a fraud action if the current retrieved vehicle data does not substantially match the stored vehicle identification profile.

6. The telematics device of claim 5, wherein the vehicle parameter comprises one or more vehicle operating parameters, a vehicle identification number (VIN), and combinations thereof.

7. The telemtatics device of claim 5, wherein performing a fraud action comprises reporting the results of the comparison to a central monitoring station.

8. The telematics device of claim 7, wherein performing a fraud action comprises terminating monitoring at the central monitoring station.

9. A computer system configured to perform the steps of a method for fraud detection, the method comprising:

receiving, by the computer system, data corresponding to at least one vehicle parameter from a telematics device coupled to a vehicle bus, wherein the telematics device retrieved the data over a predetermined period;

evaluating the data corresponding to the at least one vehicle parameter retrieved by the telematics device over the predetermined period;

generating, by the computer system, a vehicle identification profile based on the evaluating of the data that the telematics device retrieved over the predetermined period;

storing the vehicle identification profile to a memory;

comparing current received vehicle data with the stored vehicle identification profile;

determining, by the computer system, whether the telematics device has been fraudulently coupled to a vehicle bus by determining if the current received vehicle data substantially matches the stored vehicle identification profile; and performing a fraud action if the current retrieved vehicle data does not substantially match the stored vehicle identification profile.

10. The computer system of claim 9, wherein the vehicle parameter comprises one or more vehicle operating parameters, a vehicle identification number (VIN), and combinations thereof.

11. The computer system of claim 9, wherein performing a fraud action comprises terminating monitoring.

\* \* \* \* \*